Aug. 15, 1944.  E. P. BULLARD, 3D  2,355,623
TRANSMISSION
Filed Oct. 12, 1939  4 Sheets-Sheet 3

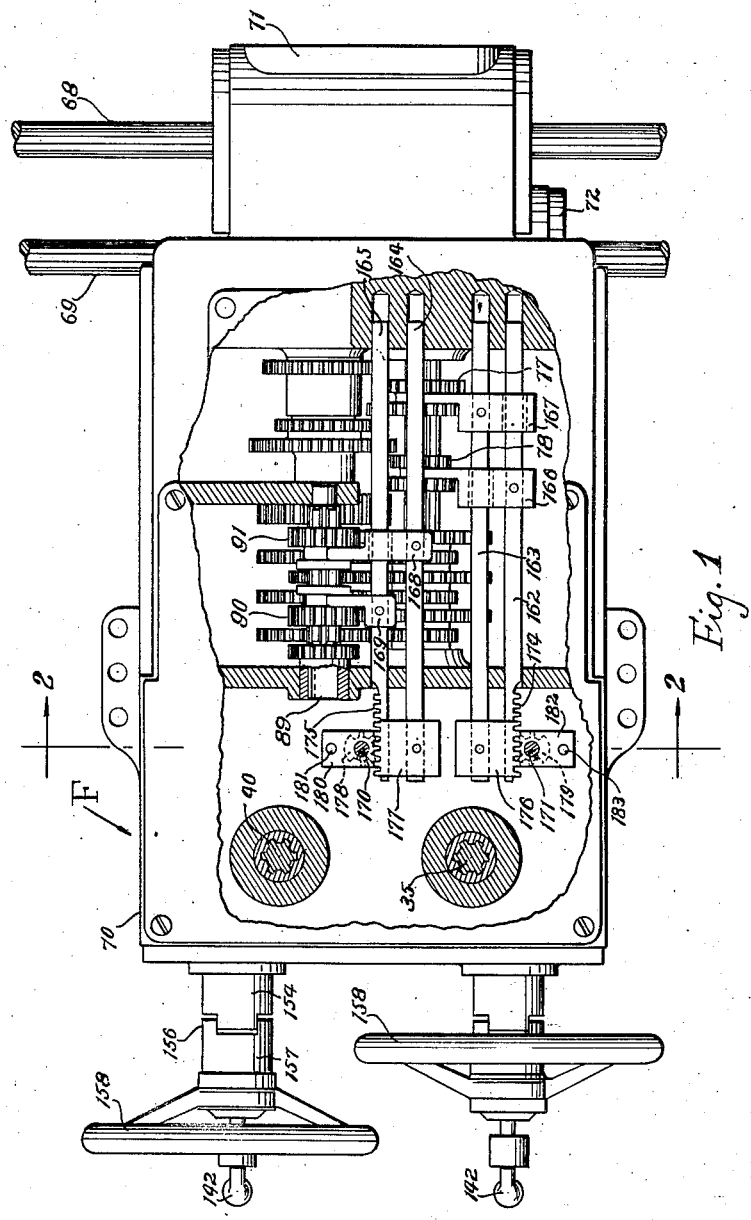

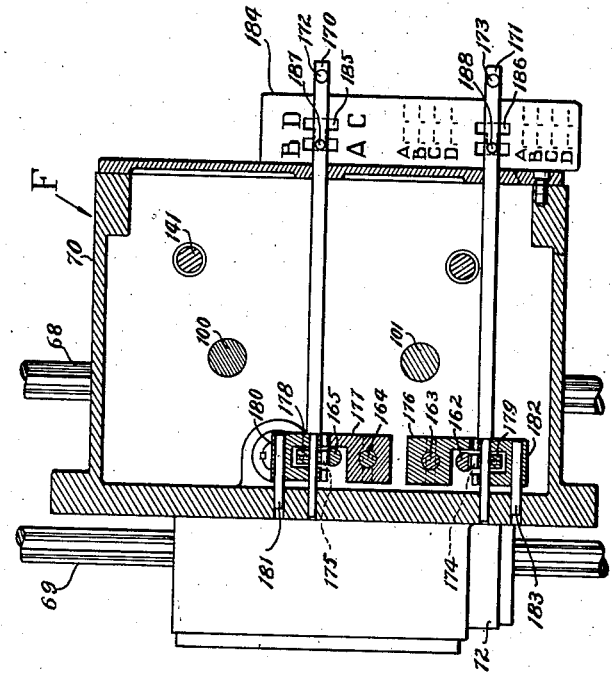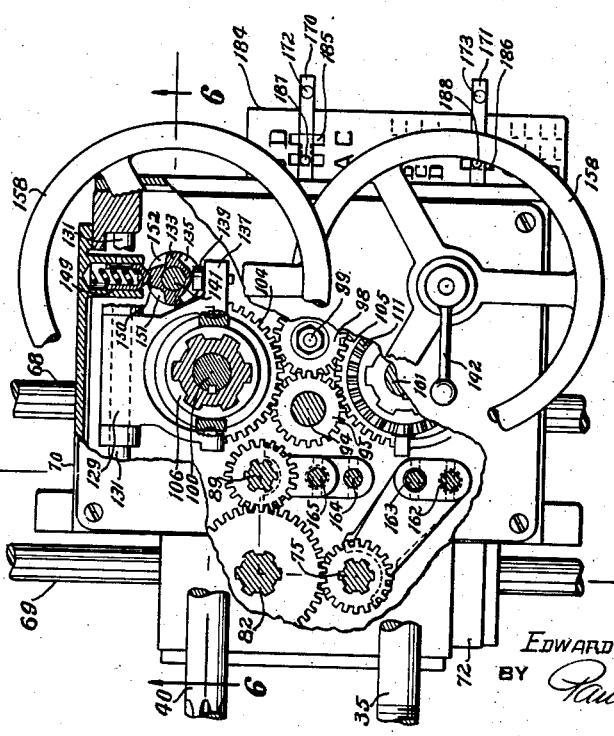

INVENTOR
Edward P. Bullard, III
BY
ATTORNEY

Aug. 15, 1944.　　　E. P. BULLARD, 3D　　　2,355,623
TRANSMISSION
Filed Oct. 12, 1939　　　4 Sheets-Sheet 4
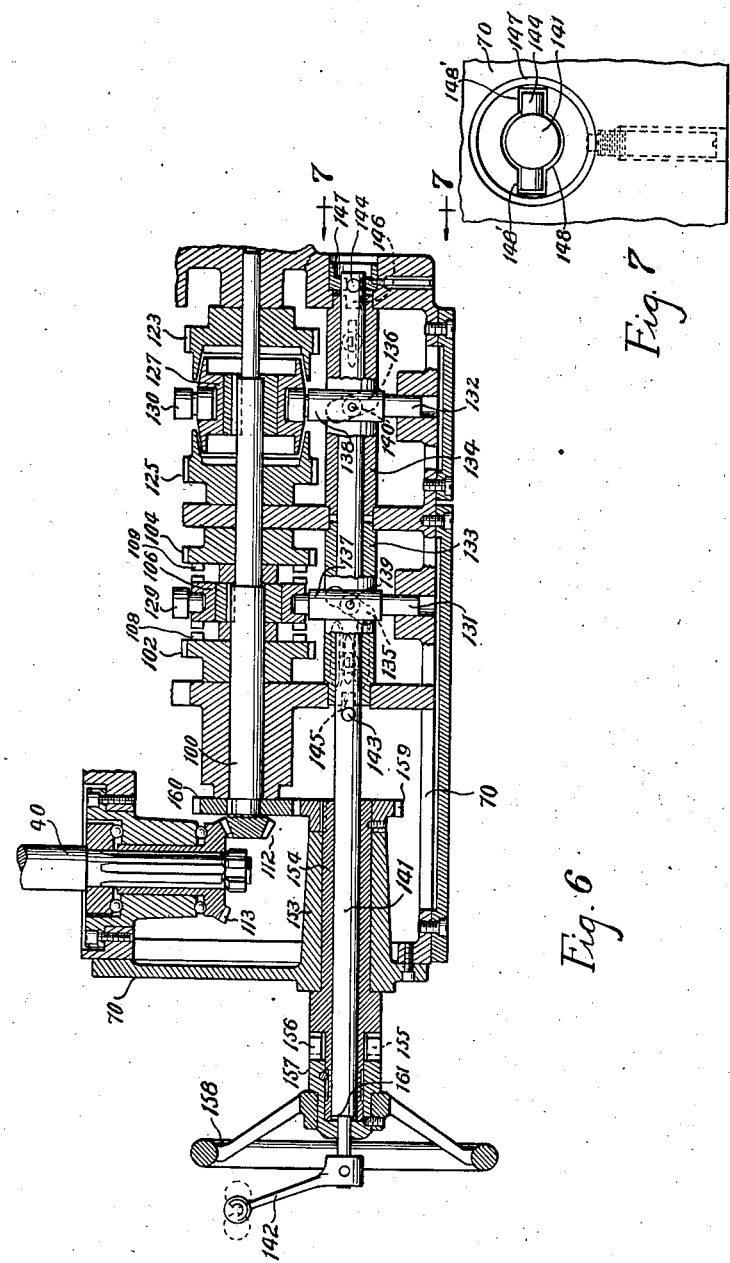
INVENTOR
EDWARD P. BULLARD, III
BY
ATTORNEY Patented Aug. 15, 1944

2,355,623

UNITED STATES PATENT OFFICE 2,355,623

TRANSMISSION

Edward P. Bullard, III, Fairfield, Conn., assignor to The Bullard Company, a corporation of Connecticut Application October 12, 1939, Serial No. 299,134

28 Claims. (Cl. 74—359)

This invention relates to transmissions in general, and particularly to a variable-speed transmission for independently rotating a plurality of driven shafts in two directions.

An object of this invention is to provide a variable-speed transmission which will independently rotate a plurality of driven shafts in two directions, and which will be compact in construction and simple in operation.

Other objects of this invention include the provision of a transmission of unitary construction enclosed within an oil-tight housing; the provision of a transmission comprising variable-speed gearing, including a speed-reduction unit between a driving and a driven shaft; the provision of a transmission in which a speed reduction unit reduces the speed of variable-speed gearing at a plurality of successive steps, at each of which the driven shaft of the variable-speed gearing is adapted selectively to be connected; the provision of a transmission in which a pair of driven shafts is adapted to be rotated at a substantially constant, relatively rapid speed, or at different relatively slow speeds in either direction; the provision of a transmission including an interlock between variable and constant-speed gearing so that only one can be effective at a time; the provision of a transmission in which a single operating lever is employed for connecting reversible, variable and constant-speed gearing to a driven shaft; the provision of a combined variable and constant-speed power transmission including manually-operable means for rotating the driven shaft thereof, which means is adapted to be automatically disconnected when the constant-speed portion of said transmission is rendered effective; and the provision of a transmission including variable-speed gearing having a plurality of shiftable gear units adapted to be moved by an axially-shiftable oscillatable shaft for each set of gear units, and in which an interlock is provided to lock the gear unit that is not in engagement with the axially-shiftable oscillatable shaft.

The above, as well as other objects and novel features of the invention will become apparent upon considering the following specification and accompanying drawings in which:

Fig. 1 is a side elevational view of a transmission to which the principles of this invention have been applied, parts being broken away to illustrate certain features of the invention;

Fig. 2 is a sectional view taken substantially along line 2—2 of Fig. 1;

Fig. 3 is a front elevational view of the transmission shown in Fig. 1, parts being broken away to disclose certain features of the invention;

Fig. 6 is a sectional plan view taken substantially along line 6—6 of Fig. 3; and Fig. 7 is an end view of a detail as viewed along line 7—7 of Fig. 6.

Figures 4, 5:
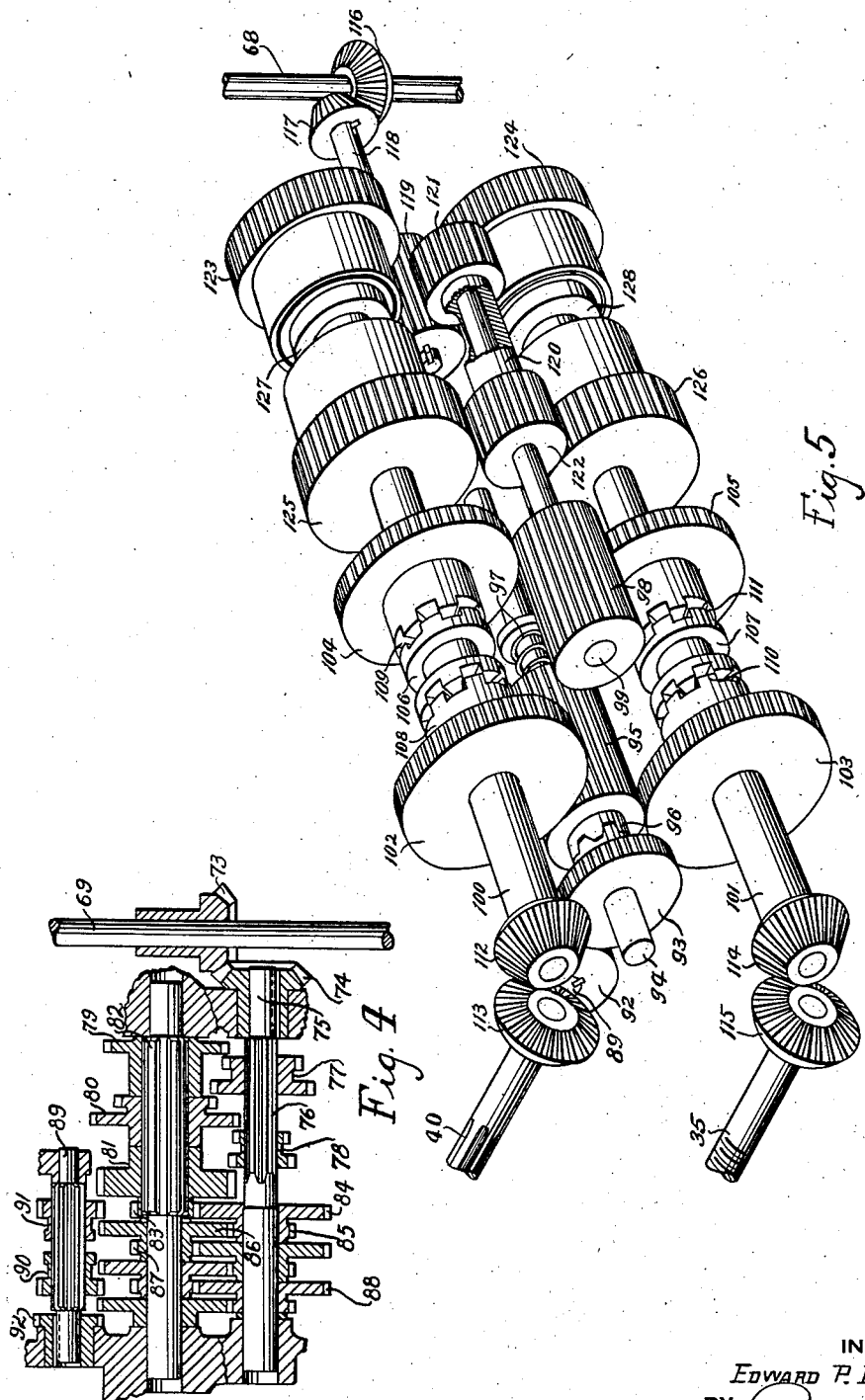
Fig. 4 is a stretch-out sectional view substantially along line 4—4 of Fig. 3, showing the variable-speed gearing of the transmission.
Fig. 5 is a perspective view of the reversing gearing of the transmission shown in Fig. 3.

Referring to Fig. 1, the transmission F comprises a substantially rectangular box-like housing 70 adapted to be hermetically sealed and to contain sufficient lubricant to keep the transmission gears submerged in oil, thereby insuring adequate lubrication, noiseless operation and preventing dust and dirt from entering the transmission. The housing 70 is provided with substantially cylindrical bosses 71 and 72 through which vertically-disposed shafts 68 and 69 are adapted to pass.

Rotative power is adapted to be supplied to the transmission by means (not shown) adapted to rotate shaft 68 at a relatively fast constant speed and shaft 69 at a plurality of relatively slow speeds. The transmission F is adapted to drive two shafts 35 and 40 forwardly and reversely at a plurality of relatively slow speeds and at a substantially constant relatively rapid speed.

Referring to Fig. 4, a bevel gear 73 is journaled in the cylindrical boss 72 and splined to the shaft 69. The bevel gear 73 meshes with a bevel gear 74 keyed to a shaft 75. A portion 76 of the shaft 75 is splined to receive slidable gear units 77 and 78. The gear units 77 and 78 are adapted to be selectively meshed with three gear units 79, 80 and 81 keyed to a shaft 82 parallel with shaft 75. The single gear of unit 79 is adapted to mesh with one gear of unit 77; and the gear unit 80 is provided with two gears one of which is adapted to be meshed with a gear of the sliding unit 77 and the other with a gear of the sliding unit 78. The gear unit 81 is provided with a gear adapted to be meshed with one of the gears of the slidable unit 78. From an inspection of Fig. 4, it is apparent that selective shifting of the slidable gear units 77 and 78 will provide four separate and distinct rotative speeds of shaft 82 from a single speed of shaft 75.

The rotative speeds provided by shaft 69 are adapted to be substantially reduced. Accordingly, a speed reduction unit is contained within the transmission F. The construction and arrangement are such that the speed of shaft 82 is reduced through a plurality of successive steps, at each of which a different driving rate for the transmission F is produced. The shafts 75 and 82 of Fig. 4 are extended to support the speed-reduction unit of the transmission. The gear unit 81 on the shaft 82 includes a relatively small gear 83 in constant mesh with a relatively large gear 84 freely journaled on the extension of shaft 75. Another relatively small gear 85 integral with gear 84 is constantly in mesh with a relatively large gear 86 freely journaled on the extension of shaft 82. A third relatively small gear 87, integral with gear 86, is also constantly in mesh with a relatively large gear 88 freely journaled on the shaft 75. The arrangement of gears 84, 85, 86, 87 and 88 may be continued indefinitely to provide any desirable number of successive steps of speed reduction. In the present instance, three steps are provided, each of which bears a definite relation to the preceding and the following. A driven shaft 89 is located within the transmission F in parallel relation to the shafts 75 and 82. Shaft 89 is actually in front of shaft 82, but for clarity, Fig. 4 discloses shaft 89 above shaft 82. A pair of gears 90 and 91 are splined to the shaft 89. Movement of the gear 91 to the right as viewed in Fig. 4 will provide four separate and distinct speeds of shaft 89 upon selectively shifting the gear units 77 and 78. Movement of gear unit 91 to the left will produce an additional four speeds of shaft 89 which speeds are reduced by the gear ratio of gears 83, 84, 85 and 86, constituting the first step of the speed-reduction unit. Shifting gear 90 to the right will produce an additional four speeds upon selectively shifting gears 77 and 78. These speeds will be further reduced corresponding to the second speed-reduction step of the unit; and shifting gear 90 to the left will produce a final four speeds of shaft 89 at the lowest rate the speed-reduction unit can accomplish. Accordingly, shaft 89 is adapted to be driven at sixteen separate and distinct speeds by selectively shifting the gears 77, 78, 90 and 91.

The sixteen speeds of the shaft 89 derived from shaft 69, as well as the substantially constant speed of the shaft 68, are adapted to be transmitted to the driven shafts 35 and 40 to drive them in both directions at the plurality of speeds of shaft 89 and the substantially constant speed of shaft 68. In the present invention this has been accomplished by providing a unique transmission including a driving shaft for each of the driven shafts 35 and 40 and a pair of auxiliary shafts, all of which support the transmitting and the reversing mechanism.

Referring to Figs. 1, 3 and 5, and particularly Fig. 5, the driven shaft 89 is provided with a gear 92 keyed thereto and adapted to constantly mesh with a gear 93 journaled on an auxiliary shaft 94. The gear 93 is adapted to drive a relatively long gear 95 likewise journaled on the shaft 94. An over-load clutch 96 is provided between the gears 93 and 95, urged into engagement by a spring 97 surrounding shaft 94. The relatively long pinion 95 is adapted to partially overlie and mesh with a similar relatively long pinion 98 freely journaled on another auxiliary shaft 99. The auxiliary shafts 94 and 99 are located in a substantially horizontal plane. A pair of driving shafts 100 and 101 are arranged in a substantially vertical plane that intersects the horizontal plane midway between the shafts 94 and 99. The shafts 100 and 101 are each provided with a pair of driving gears 102 and 103 that are constantly in mesh with the relatively long pinion 95 on the auxiliary shaft 94; and a pair of driving gears 104 and 105 in constant mesh with the relatively long pinion 98 on the auxiliary shaft 99. Gears 102 and 103 are adapted to be rotated in opposite directions from that of gears 104 and 105, and by selectively engaging gears 102, 103, 104 and 105 to the shafts 100 and 101, it is apparent that said driving shafts my be driven at sixteen different speeds in either direction upon selectively shifting the gears 77, 78, 90 and 91 of the variable speed unit. Positive-action axially-shiftable clutch members 106 and 107 are splined to the driving shafts 100 and 101 respectively. The slidable, positive-action clutch-engaging means are adapted to cooperate with mating clutch elements 108, 109, 110 and 111 on the gears 102, 104, 103 and 105, respectively. The driving shafts 101 and 100 are adapted to drive the screw shaft 35 and the splined shaft 40, respectively. Accordingly, intermeshing bevel gears 112 and 113 are fixed to the driving shaft 100 and splined shaft 40, respectively, and intermeshing bevel gears 114 and 115 are adapted to be keyed to the driving shaft 101 and the screw shaft 35, respectively.

The driving shafts 100 and 101 are adapted to be rotated in opposite directions at a substantially constant, rapid speed. Accordingly, a bevel gear 116 journaled in the substantially cylindrical boss 71 of the housing 70 is splined to shaft 68. Gear 116 is adapted to mesh with a bevel gear 117 integral with a stub shaft 118 that is coaxial with the auxiliary shaft 94. A relatively long pinion 119 is adapted to be keyed to the stub shaft 118. A relatively long sleeve gear 120 provided with gear portions 121 and 122 is adapted to be journaled on the auxiliary shaft 99, the gear portion 121 meshing with the relatively long pinion 119. Accordingly, pinion 119 and gear 120 are rotated in opposite directions. A pair of gears 123 and 124 journaled on the driving shafts 100 and 101 respectively are maintained in constant mesh with the pinion 119; and a similar pair of gears 125 and 126 journaled on the driving shafts 100 and 101, respectively, are adapted to be maintained in constant mesh with the gear portion 122 of the sleeve gear 120. Axially-shiftable friction cone clutch members 127 and 128 are splined to the driving shafts 100 and 101, respectively, between the gears 125, 123 and 124, 126. The friction clutch members 127 and 128 are adapted to engage corresponding or mating friction clutch members on adjacent sides of gears 123, 125 and 124, 126, respectively. Accordingly, by selectively shifting the clutch members 127 and 128, it is possible to drive the driving shafts 100 and 101 in either direction at a substantially constant, relatively rapid speed.

The mechanism for selectively shifting the clutch elements 106 and 127 is identical with that for shifting elements 107 and 128, and for that reason, only the shifting mechanism for the clutch elements 106 and 127 will be described. Referring to Figs. 3 and 6 of the drawings, shiftable elements 106 and 127 are provided with yoke elements 129 and 130, respectively. The yoke 129 is oscillatably mounted on a shaft 131 within the housing 70. In a similar manner, the yoke 130 is oscillatably mounted upon a shaft 132. The yoke elements 129 and 130 are actuated by a pair of axially-aligned individually-oscillatable sleeves 133 and 134 journaled within bearings mounted in the housing 70. Each of the sleeves 133 and 134 is provided with a peripheral cam slot 135 and 136, respectively. The yoke elements 129 and 130 support arms 137 and 138, respectively, that extend over the grooves 135 and 136 and provide supports for rollers 139 and 140 adapted to fit in the grooves 135 and 136, respectively. Selective oscillatable movement of the sleeves 133 and 134 will cause the yokes 129 and 130 to engage and disengage the clutch elements 106 and 127 with their corresponding mating elements 108, 109 and the cone clutch surfaces of the adjacent sides of gears 123, 125, respectively.

Selective actuation of the sleeves 133, 134 is effected by the action of an axially-movable, oscillatable shaft 141 that extends through the aligned sleeves 133 and 134. The shaft 141 extends outside of the housing 70 and is provided with a hand lever 142. The shaft 141 is provided with pins 143 and 144 adapted to seat within notches 145 and 146 located in the non-adjacent ends of the aligned sleeves 133 and 134, respectively. Axial movement of the shaft 141 to the right, as viewed in Fig. 6, will cause the pin 143 to seat within the slot 145 of sleeve 133 so that oscillation of the shaft 141 causes yoke 129 to move the clutch element 106 into and out of engagement with the gears 102 and 104. Axial movement of the shaft 141 to the left, as viewed in Fig. 6, will cause pin 144 to seat within slot 146 of sleeve 134, whereupon oscillating shaft 141 will cause the yoke 130 to shift the element 127 into clutching engagement with either gear 123 or 125.

One of the clutch-shifting elements 106, 127 must be in neutral position when the other is in engagement with its respective gears; otherwise, it would be possible to jam the transmission. An interlock is therefore provided to prevent the axial shifting of shaft 141 except when it is in position insuring the neutrality of the elements 106 and 127. Referring to Figs. 6 and 7, the interlock comprises a cup-shaped member 147 securely held within a wall of the housing 70. The cup-shaped member 147 is provided with a central opening 148 through which one end of the shaft 141 is adapted to pass. It is further provided with diametrically-disposed slots 148' on each side of the opening 148 through which the pin 144 is adapted to pass. These diametrically-disposed slots 148' are arranged so that the shaft 141 must be in a position insuring the neutrality of the clutch-engaging elements 106 and 127 before shaft 141 can be axially moved in either direction to establish a connection between it and either of the sleeves 133 or 134.

Referring to Fig. 3, a spring-pressed detent 149 is adapted to cooperate with a recess 150 to maintain the sleeve 133 in neutral position. Recesses 151 and 152 are provided on opposite sides of the recess 150 for receiving the detent 149, thereby to hold the sleeve 124 in either of its oscillated positions on each side of its neutral position. Inasmuch as the positive-action clutch-engaging means 106 is adapted to cooperate with the teeth on the gears 102 and 104, it is quite possible that the teeth may fall tooth on tooth and not properly mesh at the instant the shaft 141 is oscillated to effect engagement of the positive-action clutch 106. The recesses 151 and 152 are therefore provided with wide entrant portions, the rims of which come very close to the recess 150. The walls of the recesses 151 and 152 slope inwardly to a relatively narrow bottom portion. Because of this construction, slight oscillatable movement of shaft 141 will move sleeve 133 sufficiently for detent 149 to engage the wide entrant portions of slots 151 and 152. Thus, upon continued rotation of gears 102, 104, the spring-pressed detent 149 will automatically effect engagement of the positive-action clutch 106 even though the teeth fall tooth on tooth and the operator releases his hold on the lever 142.

The driving shaft 100 is adapted to be manually rotated independently of the transmission F. A bearing 153 is mounted in the side wall of the housing 70 adapted to support a sleeve 154 through which the shaft 141 is adapted to extend to the outside of the housing 70. The outer end of sleeve 154 is provided with teeth 155 adapted to mesh with teeth 156 on the end of a hub 157 of a hand wheel 158. Hand wheel 158 is adapted to be axially moved along the sleeve 154 to engage and disengage the teeth 155 and 156. The inner end of the sleeve 154 rigidly supports a pinion 159 that meshes with a pinion 160 keyed to the driving shaft 100. Accordingly, shifting the hand wheel 158 to the right, as viewed in Fig. 6, and rotating the same will cause rotation of driving shaft 100, and consequently, the rotation of splined shaft 40.

The size of the hand wheel 158 is sufficient to constitute a hazard to the operator as well as to produce a substantial fly-wheel effect if it is rotated at a rapid rate. The fly-wheel effect would have sufficient momentum to cause overtravel of the shafts 35 and 40. Gears 102 and 104 rotate shaft 100 and hand wheel 158 at a relatively slow rate while gears 123 and 125 rotate shaft 100 and hand wheel 158 at a rapid rate. The present invention contemplates means for insuring the separation of the teeth 155 and 156 when the clutch element 127 is shifted into operative position to drive shaft 100 by gears 123 and 125. The means includes an abutment 161 on the outer end of shaft 141 adapted to cooperate with the hand wheel 158 so that axial movement of the shaft 141 to the left, as viewed in Fig. 6, will automatically disengage the teeth 155 and 156. An identical clutch-shifting mechanism is provided for the elements 107 and 128 on driving shaft 101.

Referring to Figs. 1, 2, 3 and 4, the slidable gears 77, 78, 90 and 91 of the variable-speed unit of the transmission F are adapted to be shifted by parallel rods 162, 163, 164 and 165. Rod 162 supports a shifting element 166 adapted to engage gear 78; the rod 163 supports a shifting element 167 adapted to engage gear 77; the rod 164 supports a shifting element 168 adapted to engage gear 91; and the rod 165 supports a shifting element 169 adapted to engage the gear 90. The rods 162, 163, 164 and 165 are adapted to be selectively actuated by means of oscillatable and axially-shiftable shafts 170 and 171. The shafts 170 and 171 extend from within the housing 70 to the outside thereof and support handles 172, 173 at the outer ends thereof. The rods 162 and 165 are provided with rack teeth 174 and 175 facing in opposite directions. The rods 163 and 164 are provided at their one ends with rack elements 176 and 177. The rack elements 176 and 177 include rack teeth which are located in the same planes as the rack teeth 174 and 175, respectively. The shaft 170 is provided with a pinion 178 adapted to mesh with the rack teeth on the rod 165 and those on the rack member 177. The shaft 171 supports a pinion 179 adapted to mesh with the rack teeth on shaft 162 and those on the rack member 176. It is desirable to lock those rods 162, 163, 164 or 165 that are not in mesh with the driving pinions 178 or 179. Accordingly, a slidable yoke member 180 is mounted upon a pin 181 fixed in the housing 70. The legs of the yoke member 180 straddle the pinion 178, and the outer ends of the legs of said yoke are provided with gear teeth adapted to mesh with the rack teeth 175 and those on the rack element 177. Additionally, a yoke member 182 is mounted on a pin 183 for slidable movement. Legs of yoke 182 are likewise provided with rack teeth adapted to mesh with rack teeth 174 and those on the rack element 176. In the position shown in Fig. 2, the pinions 178 and 179 are in mesh with the rack teeth 174 and 175, while the one leg of each yoke member 180 and 182 is in mesh with the rack teeth on the elements 176 and 177, thereby preventing the movement of the rods 163 and 164. Oscillatable movement of the shafts 170 and 171 will effect shifting of rods 162 and 165 to move gears 78 and 90. Axial movement of the shafts 170 and 171 to the right, as viewed in Fig. 2, will cause the meshing of pinions 178 and 179 with the rack teeth on rack elements 176 and 177, while at the same time causing the rack teeth of one of the legs of yoke members 180 and 182 to move into mesh with the rack teeth 174 and 175. Under such circumstances, the rods 162 and 165 are locked in adjusted position, and upon oscillatable movement of the shafts 170 and 172, rods 163 and 164 will be axially moved thereby shifting gears 77 and 91.

Referring to Fig. 2, an indicator 184 is adapted to cooperate with the shafts 170 and 171. It comprises a pair of H-shaped members 185 and 186, the legs of which partially surround the shafts 170 and 171. Pins 187 and 188 in shafts 170 and 171, respectively, are adapted to cooperate with the H-shaped slots to indicate the speed ratio set up in the variable speed unit of the transmission and to prevent the axial shifting of shafts 170 and 171 except when the gears 77, 78, 90 and 91 are in a neutral position. A spring-pressed detent is provided for each shaft 170 and 171 that cooperates with notches in said shafts for releasably maintaining the gears 77, 78, 90 and 91 in complete meshing engagement. Each corner of the H-shaped slot 185 is provided with an index while a column of indices representing speeds as well as a column of the indices of H-shaped slot 185 are located adjacent the legs of the H-shaped slot 186. Accordingly, by consulting the index plate and by selectively operating the shafts 170 and 172, any one of the sixteen different speeds of the transmission F may be provided. For example, any of the speeds may be provided by placing the pin 188 in the leg of slot 186 that is in line with the column containing the desired speed, and placing the pin 187 in the leg of slot 185, the letter of which corresponds with the letter in line with the desired speed adjacent slot 186.

Although the various features of the improved transmission have been shown and described in detail to fully disclose one embodiment of this invention, it will be evident that numerous changes may be made in such details and certain features may be used without others, without departing from the principles of the invention.

What is claimed is:

1. Apparatus comprising in combination, a shaft; means on said shaft adapted to be rotated in opposite directions; a variable-speed transmission for rotating the means on said shaft comprising a primary unit including a driving and driven shaft; a plurality of gears on said driving and driven shafts adapted to be selectively intermeshed; a secondary unit including a driven shaft; a plurality of gears on the driven shaft of said secondary unit; and a speed-reduction unit between said primary and secondary units having a plurality of gears adapted to be selectively intermeshed with the gears on the driven shaft of said secondary unit.

2. A variable-speed transmission as claimed in claim 1, in which the driven shaft of the primary unit is driven at a plurality of speeds; the speed-reduction unit reduces the primary speeds through a plurality of successive steps; and the gears on the driven shaft of the secondary unit are adapted to be selectively intermeshed with gears of the speed-reduction unit.

3. A variable-speed transmission as claimed in claim 1, in which the speed-reduction unit comprises a plurality of constantly meshing gears on axes that are coaxial with the driving and driven shafts of said primary unit.

4. A variable-speed transmission as claimed in claim 1, in which said primary unit includes a driving shaft having a plurality of selectively shiftable gear units splined thereto and a parallel driven shaft having a plurality of gear units keyed thereto; said speed-reduction unit comprises a plurality of constantly meshing gears journaled on extended portions of the driving and driven shafts of said primary unit, one of which meshes with one of the gears keyed to the driven shaft of said primary unit; and in which the driven shaft of said secondary unit has splined thereto a plurality of gears adapted to be selectively shifted into and out of mesh with certain of the gears of said speed-reduction unit.

5. Apparatus comprising in combination, separate rotatable shafts; a driving shaft for each of said rotatable shafts; a pair of auxiliary shafts; a variable-speed transmission connected to means on both of said auxiliary shafts for rotating means journaled on said driving shafts in opposite directions; constant-speed transmission means connected to additional means on both of said auxiliary shafts for rotating additional means journaled on said driving shafts in opposite directions; and means for selectively engaging any of said oppositely-rotatable means with said driving shafts.

6. Apparatus as claimed in claim 5 in which said variable-speed transmission is connected to the means on said auxiliary shafts through an overload connection; and the means for selectively engaging said oppositely-rotatable means with said driving shafts comprises a clutch between the oppositely-rotatable means that is controlled by the variable-speed transmission, and another clutch between the oppositely-rotatable means that is controlled by the constant-speed transmission means.

7. A transmission including a driven shaft; a driving shaft; means for rotating said driving shaft comprising means journaled thereon and adapted to be rotated in opposite directions; a clutch for engaging said driving shaft with either of said oppositely rotatable means; a handwheel for manually rotating said driving shaft; and a hand lever connected to a shaft extending through the axis of said handwheel and connected to means for shifting said clutch to engage said driving shaft with either of said oppositely-rotatable means.

8. A transmission as claimed in claim 7 in which said clutch-shifting means comprises an oscillatable sleeve having a peripheral cam groove adapted to receive a cam roller connected to a clutch-shifting yoke that engages said clutch.

9. A transmission as claimed in claim 7, in which the means journaled on said driving shaft is driven by a variable-speed transmission.

10. A transmission as claimed in claim 7 in which the means journaled on said driving shaft is driven by a constant speed drive.

11. Apparatus comprising in combination, separate rotatable shafts; a driving shaft for each of said rotatable shafts; means for rotating said driving shafts comprising means journaled on each adapted to be rotated in opposite directions; clutches for engaging each of said driving shafts with the oppositely-rotatable means journaled thereon; handwheels connected to each of said driving shafts; and a hand lever fixed to a shaft extending through the axis of each of said handwheels and connected to means for shifting said clutches to engage said driving shafts with either of the oppositely-rotatable means on said driving shafts.

12. A transmission comprising in combination, a driven shaft; a driving shaft; a variable-speed drive for rotating means journaled on said driving shaft in opposite directions at a plurality of speeds; a constant-speed drive for rotating separate means on said driving shaft in opposite directions at a constant speed; clutches for connecting said driving shaft to any of said oppositely-rotatable means; and means for selectively shifting said clutches.

13. A transmission as claimed in claim 12, in which said clutch-shifting means comprises a pair of axially aligned oscillatable sleeves having means for selectively moving said clutches upon oscillatable movement being imparted thereto; and an axially-shiftable oscillatable shaft extending through said sleeves adapted to selectively engage either of said sleeves.

14. A transmission as claimed in claim 12, in which said clutch-shifting means comprises a pair of axially-aligned oscillatable sleeves having means for selectively shifting said clutches upon oscillatable movement being imparted thereto and an axially-shiftable oscillatable shaft extending through said sleeves; means on said axially-shiftable oscillatable shaft adapted to be selectively moved into and out of driving engagement with means on said sleeves; and means for preventing the axial movement of said axially-shiftable oscillatable shaft when either of said clutches is engaged with any of said oppositely-rotatable means.

15. Apparatus comprising in combination, separate rotatable driven shafts; a driving shaft for each of said driven shafts; a variable-speed transmission for rotating means journaled on each of said driving shafts in opposite directions at a plurality of speeds; a constant-speed drive for rotating separate means on each of said driving shafts in opposite directions at a substantially constant speed; clutches for connecting said driving shafts to any of said oppositely-rotatable means; and means for selectively shifting said clutches.

16. Apparatus as claimed in claim 15, in which said clutch-shifting means comprises a pair of axially-aligned oscillatable sleeves for each of said driving shafts, each of said sleeves having means for selectively moving one of said clutches upon oscillatable movement being imparted to said sleeve and separate axially-shiftable oscillatable shafts extending through each pair of said sleeves, each shaft being adapted to selectively engage each sleeve of the pair through which it extends.

17. Apparatus as claimed in claim 15, in which said clutch-shifting means comprises a pair of axially-aligned oscillatable sleeves for each of said driving shafts, each of said sleeves having means for selectively moving one of said clutches upon oscillatable movement being imparted to said sleeve, and separate axially-shiftable oscillatable shafts extending through each pair of said sleeves; means on each of said axially-shiftable oscillatable shafts adapted to be moved into and out of driving engagement with means on the sleeves through which it extends; and means for preventing the axial movement of said axially-shiftable oscillatable shafts relative to the pair of sleeves through which it extends when either of the clutches controlled by said pair of sleeves is in engagement with any of said oppositely-rotatable means.

18. A transmission comprising in combination a driven shaft separate means for driving said driven shaft at a constant and at a variable speed in either direction; clutches for establishing either of said drives; means for shifting said clutches; means for manually rotating said driven shaft; and means for rendering said manual means ineffective when one of said separate means for driving said driven shaft is established by the shifting of one of said clutches.

19. A transmission as claimed in claim 18, in which the means for shifting said clutches comprises axially aligned oscillatable sleeves having peripheral cam grooves within which rollers connected to clutch-shifting levers are adapted to travel, and an axially-shiftable oscillatable shaft extending through said sleeves adapted to be selectively engaged and disengaged from said sleeves.

20. A transmission as claimed in claim 18, in which said clutch-shifting mechanism comprises axially-aligned oscillatable sleeves through which an axially-shiftable oscillatable shaft is adapted to pass; said manual means comprises a handwheel journaled on said axially-shiftable shaft, and adapted to be axially moved into clutching engagement with means for rotating said driving shaft; and the means for rendering said manual means ineffective comprises means on said axially-shiftable shaft adapted to cooperate with said handwheel upon axial movement of said shiftable shaft in one direction to move said handwheel out of clutching engagement with the means for rotating said driving shaft.

21. Apparatus comprising a driving shaft; oppositely-rotatable means journaled on said driving shaft adapted to be rotated at a plurality of speeds; separate oppositely-rotatable means journaled on said driving shaft adapted to be rotated at a constant speed; clutches for engaging any of said rotatable means with said driving shaft; axially aligned oscillatable sleeves having means for shifting said clutches upon oscillation of said sleeves; an axially-shiftable oscillatable shaft mounted within said sleeves and provided with means for engaging said sleeves; means for manually rotating said driving shaft; and means for rendering said manually rotatable means ineffective when said axially-shiftable shaft is moved to effect engagement of one of said clutches with one of said rotatable means.

22. In a transmission, a pair of driving shafts; a pair of auxiliary shafts; means on each of said driving shafts adapted to be rotated in opposite directions by means on said auxiliary shafts; positive-acting variable-speed means adapted to drive the means on said auxiliary shafts; additional means on each of said driving shafts adapted to be rotated in opposite directions by additional means on said auxiliary shafts; constant speed means for driving said additional means on said auxiliary shafts; means for manually connecting any of said means on said driving shafts to said shafts; handwheels for manually rotating said driving shafts independently of said transmission, through the central axis of which the manual connecting means extends; and means for changing and indicating the speed at which said positive-acting variable speed means is adapted to operate.

23. In a transmission, a pair of shafts adapted to be driven; a driving shaft for each of said driven shafts; a pair of auxiliary shafts; a variable speed transmission adapted to rotate means on said auxiliary shafts in opposite directions at a plurality of relatively slow speeds; means adapted to rotate additional means on said auxiliary shafts in opposite directions and at a substantially constant relatively rapid speed; means journaled on each of said driving shafts adapted to be driven in opposite directions by said variable and constant speed means; means for connecting and disconnecting said constant and variable speed means to the means journaled on said driving shafts; handwheels connected to each of the pair of shafts, said connecting and disconnecting means comprising shafts that pass through the axes of said handwheels and which shafts cooperate with oscillatable means for actuating said connecting and disconnecting means; and means for insuring complete action of said connecting and disconnecting means upon a predetermined oscillatable movement being imparted to said oscillatable means.

24. In a transmission, a driven shaft; a driving shaft; separate means journaled on said driving shaft adapted to be rotated in opposite directions; a pair of shafts including oppositely rotatable means adapted to drive the oppositely rotatable means journaled on said driving shaft; variable-speed means for driving said pair of shafts including a driving shaft, an intermediate shaft and a driven shaft; shiftable gear means on the driving shaft of said variable-speed means adapted to mesh with gears on said intermediate shaft; intermeshing speed-reduction gears journaled on said driving and intermediate shafts of said variable-speed means; and shiftable gears on the driven shaft of said variable-speed means adapted to mesh with certain of said speed-reduction gears.

25. In a transmission, a pair of driven shafts; a driving shaft for each of said driven shafts; separate means journaled on each of said driving shafts adapted to be rotated in opposite directions; a pair of auxiliary shafts including oppositely rotatable means adapted to drive the oppositely rotatable means journaled on said driving shafts; variable-speed means for driving said pair of shafts including a driving shaft, an intermediate shaft and a driven shaft; shiftable gear means on the driving shaft of said variable-speed means adapted to mesh with gears on said intermediate shaft; intermeshing speed-reduction gears journaled on said driving and intermediate shafts of said variable-speed means; and shiftable gears on the driven shaft of said variable-speed means adapted to mesh with certain of said speed-reduction gears.

26. Apparatus comprising in combination, separate rotatable shafts; a driving shaft for each of said separate rotatable shafts; a pair of auxiliary shafts; relatively long, intermeshing, partially over-lapping gears journaled on said auxiliary shafts; power means connected to said over-lapping gears for rotating means journaled on said driving shafts in opposite directions; and means for selectively engaging said oppositely rotatable means with said driving shafts.

27. Apparatus comprising in combination, separate rotatable shafts; a driving shaft for each of said separate rotatable shafts; a pair of auxiliary shafts; relatively long, intermeshing, partially over-lapping gears journaled on said auxiliary shafts; power means connected to said over-lapping gears; a pair of gears on each driving shaft, one of the pair of gears on each driving shaft meshing with one, and the other of the pair of gears on each driving shaft meshing with the other of said gears on said auxiliary shafts; and means for selectively engaging said pairs of gears with said driving shafts.

28. In a transmission including mechanism adapted to drive a plurality of shafts in both directions, means for rotating said mechanism at a plurality of speeds comprising a first shaft adapted to support a plurality of shiftable gears; a second shaft adapted to support a plurality of gears adapted to be meshed with the gears on the first shaft; a plurality of intermeshing speed reducing gears journaled on said first and second shafts and driven by means on said second shaft; and a third shaft adapted to support a plurality of shiftable gears that are adapted to be meshed with certain of said speed reducing gears.

EDWARD P. BULLARD, III.